US011228526B2

(12) United States Patent
Du et al.

(10) Patent No.: US 11,228,526 B2
(45) Date of Patent: Jan. 18, 2022

(54) FLEXIBLE ETHERNET PATH ESTABLISHMENT METHOD AND NETWORK DEVICE

(71) Applicant: HUAWEI TECHNOLOGIES CO., LTD., Shenzhen (CN)

(72) Inventors: Zongpeng Du, Shenzhen (CN); Guoyi Chen, Beijing (CN); Jie Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 16/749,506

(22) Filed: Jan. 22, 2020

(65) Prior Publication Data
US 2020/0162376 A1 May 21, 2020

Related U.S. Application Data

(63) Continuation of application No. PCT/CN2018/098610, filed on Aug. 3, 2018.

(51) Int. Cl.
*H04L 12/723* (2013.01)
*H04L 12/707* (2013.01)
(Continued)

(52) U.S. Cl.
CPC .............. *H04L 45/50* (2013.01); *H04L 45/22* (2013.01); *H04L 47/2441* (2013.01); *H04L 67/327* (2013.01); *H04W 40/246* (2013.01)

(58) Field of Classification Search
CPC ......... H04L 49/20; H04L 45/22; H04L 45/50; H04L 47/2441; H04L 67/327; H04W 40/246
(Continued)

(56) References Cited

U.S. PATENT DOCUMENTS

| 2003/0016808 A1 | 1/2003 | Hu et al. |
| 2007/0280117 A1 | 12/2007 | Katz et al. |

(Continued)

FOREIGN PATENT DOCUMENTS

| CN | 106803811 A | 6/2017 |
| CN | 106803814 A | 6/2017 |

(Continued)

OTHER PUBLICATIONS

OIF-FLEXE-01.0 Optical Internetworking Forum, "Flex Ethernet Implementation Agreement", dated Mar. 2016, total 31 pages.
(Continued)

*Primary Examiner* — Rownak Islam
(74) *Attorney, Agent, or Firm* — Stein IP, LLC

(57) ABSTRACT

A method and a network device for establishing FlexE path includes a first forwarding node receiving a first path establishment request message sent by a first source node, where the first path establishment request message is used to establish a first FlexE path between the first source node and a first destination node, and the first FlexE path is used to transmit a first service flow; the first forwarding node
(Continued)

establishing a second FlexE path between the first forwarding node and a second forwarding node based on the first path establishment request message, and deleting an established third FlexE path between the first forwarding node and the second forwarding node after the second FlexE path is established; and the first forwarding node establishing and storing a correspondence between the first FlexE path and the second FlexE path.

11 Claims, 6 Drawing Sheets

(51) Int. Cl.
  *H04L 12/851* (2013.01)
  *H04L 29/08* (2006.01)
  *H04W 40/24* (2009.01)
(58) Field of Classification Search
  USPC ............................................. 370/329
  See application file for complete search history.

(56) References Cited

U.S. PATENT DOCUMENTS

2017/0005949 A1   1/2017  Gareau
2018/0013511 A1*  1/2018  Hussain .............. H04J 14/0205

FOREIGN PATENT DOCUMENTS

CN          107612825 A       1/2018
WO    WO-2017156987 A1 *    9/2017

OTHER PUBLICATIONS

RFC3209 D. Awduche et al.,"RSVP-TE: Extensions to RSVP for LSP Tunnels",Network Working Group,dated Dec. 2001,total 61 pages.
RFC3936 K. Kompella et al."Procedures for Modifying the Resource reSerVation Protocol (RSVP)",Network Working Group,dated Oct. 2004,total 7 pages.
RFC2205 R. Braden. Ed. et al.,"Resource ReSerVation Protocol (RSVP)—Version 1 Functional Specification", Network Working Group ,dated Sep. 1997,total 112 pages.
T-REC-G.709-201611-I!Amd1!PDF-E G.709/Y.1331 Series G: Transmission Systems and Media, Digital Systems and Networks Digital terminal equipments—General Series Y: Global Information Infrastructure, Internet Protocol Aspects, Next-Generation Networks, Internet of Things and Smart Cities Internet protocol aspects—Transport Interfaces for the optical transport network Amendment 1,dated Nov. 2016,total 250 pages.
IEEE Std 802.3™—2015 IEEE Standard for Ethernet IEEE Computer Society, Approved Sep. 3, 2015,total 4017 pages.
Wang Q et al: "RSVP-TE Signaling Extensions in support of Flexible Ethernet networks; draft-wang-ccamp-fl exe-signali ng-02. txt",total 13 pages.

* cited by examiner

FLEXIBLE ETHERNET PATH ESTABLISHMENT METHOD AND NETWORK DEVICE

CROSS-REFERENCE TO RELATED APPLICATIONS

This application is a continuation of International Application No. PCT/CN2018/098610, filed on Aug. 3, 2018, which claims priority to Chinese Patent Application No. 201710662235.0, filed on Aug. 4, 2017. The disclosures of the aforementioned applications are hereby incorporated by reference in their entireties.

TECHNICAL FIELD

This application relates to the flexible ethernet field, and more specifically, to a flexible ethernet (FlexE) path establishment method and a network device.

BACKGROUND

A flexible ethernet and ethernet technology developed based on a conventional ethernet. Bandwidth of services of different flexible ethernet clients (FlexE Client) can be separated at a port by using the FlexE technology. Therefore, such a technology may also be applied to an Internet Protocol (IP) ethernet, to ensure quality of service (QoS) of a specific service. For example, a node 11, a node 13, a node 14, a node 16, and a node 17 are connected to each other through the FlexE, a service flow 1 whose source node is the node 13 and destination node is the node 16 may be carried by establishing an end-to-end FlexE path (or channel) 1 that passes through the node 14 and that is between the node 13 and the node 16, and a service flow 2 whose source node is the node 11 and destination node is the node 17 may be carried by establishing an end-to-end FlexE path 2 that is between the node 11 and the node 17 and whose forwarding nodes are successively the node 13, the node 14, and the node 16. Exclusive bandwidth assurance and service separation may be provided for the service flow 1 and the service flow 2, to ensure QoS of the service flow 1 and QoS of the service flow 2.

As shown in FIG. 3, when the FlexE path 2 is established, an end-to-end FlexE path between the node 13 and the edge node 16 needs to be re-established. The re-established FlexE path is used as a part of the FlexE path 2. When the service flow 2 arrives at the node 13, the service flow is carried by using the re-established FlexE path. In this way, the nodes 13 and 16 need to maintain at least two FlexE paths (namely, the FlexE path 1 and the FlexE path 2). Consequently, management complexity of edge forwarding nodes B1 and B2 is increased, and signaling overheads caused by maintaining the FlexE paths are increased.

SUMMARY

Aspects of this application provide a FlexE path establishment method and a network device, to reduce management complexity of a control plane of a node and signaling overheads required for maintaining a FlexE path.

According to a first aspect, a FlexE path establishment method is provided, including: receiving, by a first forwarding node, a first path establishment request message sent by a first source node, where the first path establishment request message is used to establish a first FlexE path between the first source node and a first destination node, the first FlexE path is used to transmit a first service flow, the first path establishment request message includes first routing information, the first routing information is used to indicate information about a node on the first FlexE path, and the first forwarding node on the first FlexE path is an upstream node of a second forwarding node on the first FlexE path; establishing, by the first forwarding node, a second FlexE path between the first forwarding node and the second forwarding node based on the first path establishment request message, and deleting an established third FlexE path between the first forwarding node and the second forwarding node after the second FlexE path is established, where the third FlexE path is used to transmit a second service flow, and the second FlexE path can meet a bandwidth requirement of the first service flow and a bandwidth requirement of the second service flow; and establishing and storing, by the first forwarding node, a correspondence between the first FlexE path and the second FlexE path, so that the first service flow and the second service flow are mapped to a slot on the second FlexE path.

In the flexible ethernet path establishment method in this embodiment of this application, when the third FlexE path for transmitting the second service flow is established, if the first service flow further needs to be transmitted, the second FlexE path between the first forwarding node and the second forwarding node may be re-established, to converge the first service flow and the second service flow onto the second FlexE path for forwarding, and the third FlexE path is deleted. In this way, a quantity of FlexE paths established between the first forwarding node and the second forwarding node can be reduced, so that a quantity of FlexE paths needing to be maintained by a control plane of the first forwarding node and the second forwarding node can be reduced, and management complexity of the control plane of the first forwarding node and the second forwarding node and signaling overheads required for maintaining the FlexE paths can be reduced.

Optionally, the first path establishment request message may further include path type information, and the path type information is used to indicate that a type of an established path is a FlexE path. In addition, it may also be specified in this embodiment of this application that a type of a path needing to be established by each node by default is a FlexE path.

Optionally, path establishment request messages such as the first path establishment request message and the second path establishment request message used in this application may be path messages in a Resource Reservation Protocol-Traffic Engineering (RSVP), but are not limited to the path messages in this embodiment of this application.

The method in this application may be implemented by using an existing protocol by using the path messages, so that system compatibility can be improved.

In a possible implementation, the second FlexE path reuses a session established when the third FlexE path is established.

A session (session) (for example, the session is marked as a second session) is established while the third FlexE path is established. The second FlexE path may be established based on the second session, in other words, the second FlexE path corresponds to the second session. Interworking with the prior art to a greater extent can be performed by using such a method.

In a possible implementation, a slot resource that is used to transmit the second service flow and that is on the second FlexE path is the same as a slot resource that is used to transmit the second service flow and that is on the third FlexE path.

In other words, a slot resource that is used to transmit the second service flow and that is in slot resources reserved by the second FlexE path is the same as a slot resource that is used to transmit the second service flow and that is in slot resources reserved by the third FlexE path. Interworking with the prior art to a greater extent can be performed by using such a method.

In a possible implementation, the establishing and storing, by the first forwarding node, a correspondence between the first FlexE path and the second FlexE path includes: sending, by the first forwarding node, a second path establishment request message to a next node of the first forwarding node on the second FlexE path, where the second path establishment request message includes second routing information, and the second routing information is used to indicate information about a node on the second FlexE path, so that the next node of the first forwarding node sends the second path establishment request message based on the second routing information; receiving, by the first forwarding node, a second resource reservation message that is sent by the next node of the first forwarding node based on the second path establishment request message; and determining, by the first forwarding node, a first slot resource on the second FlexE path based on the second resource reservation message, and establishing and storing a correspondence among the first slot resource, the first FlexE path, and the second FlexE path, so that the first service flow carried on the first FlexE path is mapped to a slot corresponding to the first slot resource It should be understood that resource reservation messages such as a first resource reservation message and the second resource reservation message used in this application may be resv messages in RSVP, but are not limited to the resv messages in this embodiment of this application.

Optionally, the first slot resource may be determined by the next node of the first forwarding node, the next node of the first forwarding node may add indication information of the first slot resource to the second resource reservation message, and the first forwarding node may determine the first slot resource based on the indication information.

Further, the indication information may be a generalized multiprotocol label switching (GMPLS) label, and the GMPLS label is used to indicate the first slot resource. It should be understood that the GMPLS label may also indicate the above slot resource that is used to transmit the second service flow and that is on the third FlexE path. It should be understood that in this application, the indication information is not limited to being the GMPLS label.

After the first slot resource is determined in, for example, the foregoing two possible implementations, the first forwarding node may modify a FlexE configuration on an inbound interface of the next node of the first forwarding node by using an in-band control channel between the first forwarding node and the next node of the first forwarding node, so as to modify a slot configuration of the second FlexE path.

In a possible implementation, the method may further include: receiving, by the first forwarding node, a third path establishment request message, where the third path establishment request message is used to establish a fourth FlexE path between a second source node and a second destination node, the fourth FlexE path is used to transmit a third service flow, the third path establishment request message includes third routing information, the third routing information is used to indicate information about a node on the fourth FlexE path, and a next node of the first forwarding node on the fourth FlexE path is the second destination node; sending, by the first forwarding node, the third path establishment request message to the second destination node; receiving, by the first forwarding node, a third resource reservation message that is sent by the second destination node based on the third path establishment request message; determining, by the first forwarding node, a third slot resource based on the third resource reservation message; and establishing and storing, by the first forwarding node, a correspondence between the third slot resource and a fourth slot resource on a fifth FlexE path, so that the first forwarding node maps, to a slot corresponding to the third slot resource, the third service flow mapped to a slot corresponding to the fourth slot resource, where the fifth FlexE path is a FlexE path between the second forwarding node and the first forwarding node, and the slot corresponding to the third slot resource is a slot that is used to transmit the third service flow and that is on the fifth FlexE path.

In this way, when a service flow is forwarded, the first forwarding node may map, based on the correspondence between the third slot resource and the fourth slot resource on the fifth FlexE path, the third service flow to the slot corresponding to the third slot resource for transmission, where the third service flow is mapped from a previous node of the first source node on the fourth FlexE path to the slot corresponding to the fourth slot resource.

It should be understood that, in this embodiment, the second source node and the second destination node may be respectively the first destination node and the first source node. In this way, the fourth FlexE path is a FlexE path between the first destination node and the first source node, the fifth FlexE path is a path between the second forwarding node and the first forwarding node, and the fifth FlexE path may be considered as a part of the fourth FlexE path.

According to a second aspect, a network device is provided, including a unit configured to perform the method in any one of the first aspect or the possible implementations of the first aspect.

According to a third aspect, a network device is provided, including a memory, a processor, and a communications interface. The memory is configured to store program code, and the processor is configured to execute the program code stored in the memory, to perform an operation corresponding to the method in any one of the first aspect or the possible implementations of the first aspect.

According to a fourth aspect, a computer-readable medium is provided, where the computer-readable medium stores program code, and the program code includes an instruction used to perform the method in any one of the first aspect or the possible implementations of the first aspect.

According to a fifth aspect, a computer program product including an instruction is provided, where when the computer program product is run on a computer, the computer is enabled to perform the method in any one of the first aspect or the possible implementations of the first aspect.

DESCRIPTION OF EMBODIMENTS

The following describes technical solutions of this application with reference to accompanying drawings.

A node used in this application, such as a first source node, a first destination node, a first forwarding node, or another network device, may be a router or a switch.

A "next node of a node A" in this application is a node that is a downstream node of the node A and that is directly connected to the node A in a direction of a FlexE path through a FlexE. For example, a next node of the first forwarding node is a node that is a downstream node of the first forwarding node and that is directly connected to the first forwarding node through the FlexE. It should be understood that no intermediate node exists between the node A and the next node of the node A in the direction of the FlexE path.

A "previous node of the node A" in this application is a node that is an upstream node of the node A and that is directly connected to the node A in the direction of a FlexE path through a FlexE. For example, a previous node of the first forwarding node is a node that is an upstream node of the first forwarding node and that is directly connected to the first forwarding node through the FlexE. It should be understood that no intermediate node exists between the node A and the previous node of the node A in the direction of the FlexE path.

A source node in this application such as the first source node or a second source node is a transmit end of data.

A destination node in this application such as the first destination node or a second destination node is a receive end of data.

Before the solutions of this application are described, a FlexE technology and a FlexE path are briefly described first.

Figure 1:
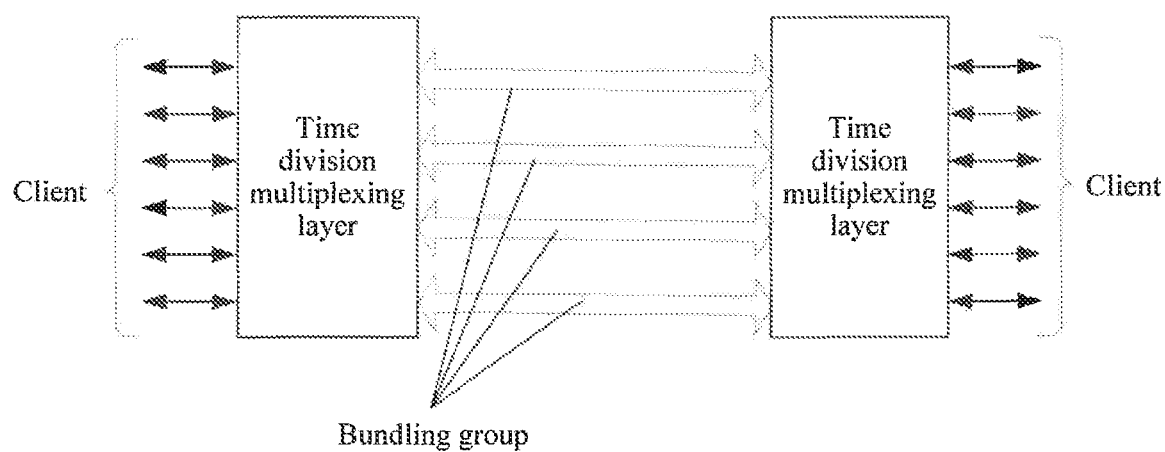
FIG. 1 is an architectural diagram of an existing flexible ethernet.

As shown in FIG. 1, new concepts such as a bundling group (FlexE Group, bundling group for short below), a flexible ethernet client (FlexE Client, client for short below), a slot (Calendar), a flexible ethernet time division multiplexing layer (FlexE Shim, time division multiplexing layer for short below), and a FlexE interface are introduced in a FlexE based on a conventional ethernet.

Bundling group: The bundling group may be obtained by bundling a plurality of physical layers (PHYs). For example, the bundling group may include 1 to 254 PHYs supporting a rate of 100 GE. A bandwidth resource corresponding to a bundling group is a sum of bandwidth resources corresponding to the PHYs in the bundling group. A plurality of service flows may be transmitted in parallel through a FlexE by using the bundling group, and service data of a same service flow may be carried on one PHY in the bundling group, or may be carried on different PHYs in the bundling group. That is, service data of a same service flow may be transmitted to a peer end by using one PHY in the bundling group, or may be transmitted to a peer end by using a plurality of PHYs in the bundling group.

PHY: the PHY may be defined as providing mechanical, electronic, functional, and normative characteristics for establishing, maintaining, and removing a physical link required for data transmission. For example, the PHY may include physical layer working devices at a receive end and a transmit end, and an optical fiber located between the receive end and the transmit end. For example, the physical layer working devices may include physical layer interface devices (Physical Layer Interface Devices) and the like of an ethernet.

FlexE interface: A FlexE interface may be considered as a bundling group. Data of the FlexE interface needs to be received or sent by using an external PHY. One FlexE interface may be connected to one or more external PHYs, and bandwidth of an entire FlexE interface is determined based on a sum of bandwidth of the PHYs.

In this application, an index or identity (Identity, ID) of a bundling group may be used to indicate the bundling group or a FlexE interface, or a bundling group or a FlexE interface may be indicated by using an index or ID of the bundling group. For example, a bundling group or an interface whose ID is 1 is indicated as a bundling group 1 or an interface 1, or a bundling group 1 or an interface 1 indicates a bundling group or an interface whose ID is 1.

In addition, in this application, an inbound interface indicates a FlexE interface used by a node to receive data, that is, a FlexE interface used by a previous node of the node to send the data. An outbound interface indicates a FlexE interface used by the node to send data, that is, a FlexE interface used by a next node of the node to receive the data.

Client: The client may be understood as a channel with independent bandwidth. A value of bandwidth of each client may be configured by a user (in a slot scheduling manner).

Slot: A bandwidth resource of a PHY is usually divided into a plurality of slots (for example, 20 slots). During actual use, service data is first encapsulated into a slot, and then the slot is mapped to a PHY in a bundling group. A mapping relationship between a slot and a PHY is recorded in a slot configuration table of a FlexE. The FlexE usually supports two slot configuration tables, one slot configuration table is currently being used, and the other slot configuration table may be on standby. Mutual switching may be performed between the two slot configuration tables. A specific switching occasion may be negotiated by upstream and downstream nodes, and synchronous switching is performed. In this way, when a service configuration of a client changes, a service of another client is not affected.

Time division multiplexing layer: the time division multiplexing layer is mainly used to arrange 64b/66b blocks of service data based on a preconfigured slot configuration table (which may be specifically configured by a user), that is, the 64b/66b blocks corresponding to the service data are encapsulated into slots obtained through predivision, and then planned slots are mapped to PHYs in a bundling group for transmission. Each slot is mapped to one PHY in the bundling group.

In this application, an index or ID of a slot may be used to indicate a slot in a bundling group, or a slot in a bundling group may be indicated by using an index or ID of the slot. For example, a slot whose ID is 1 indicates a slot 1 in a bundling group, or a slot 1 indicates a slot whose ID or index is 1.

In addition, in this application, an incoming slot indicates a slot to which data sent to a node is mapped, in other words, a slot to which a previous node of the node maps the data. In other words, the previous node of the node may map the data to the incoming slot and the data is transmitted to the node. An outcoming slot indicates a slot to which the node maps data, in other words, the node may map the data to the outcoming slot for transmission. The outcoming slot is an incoming slot of a next node of the node.

Figure 2:
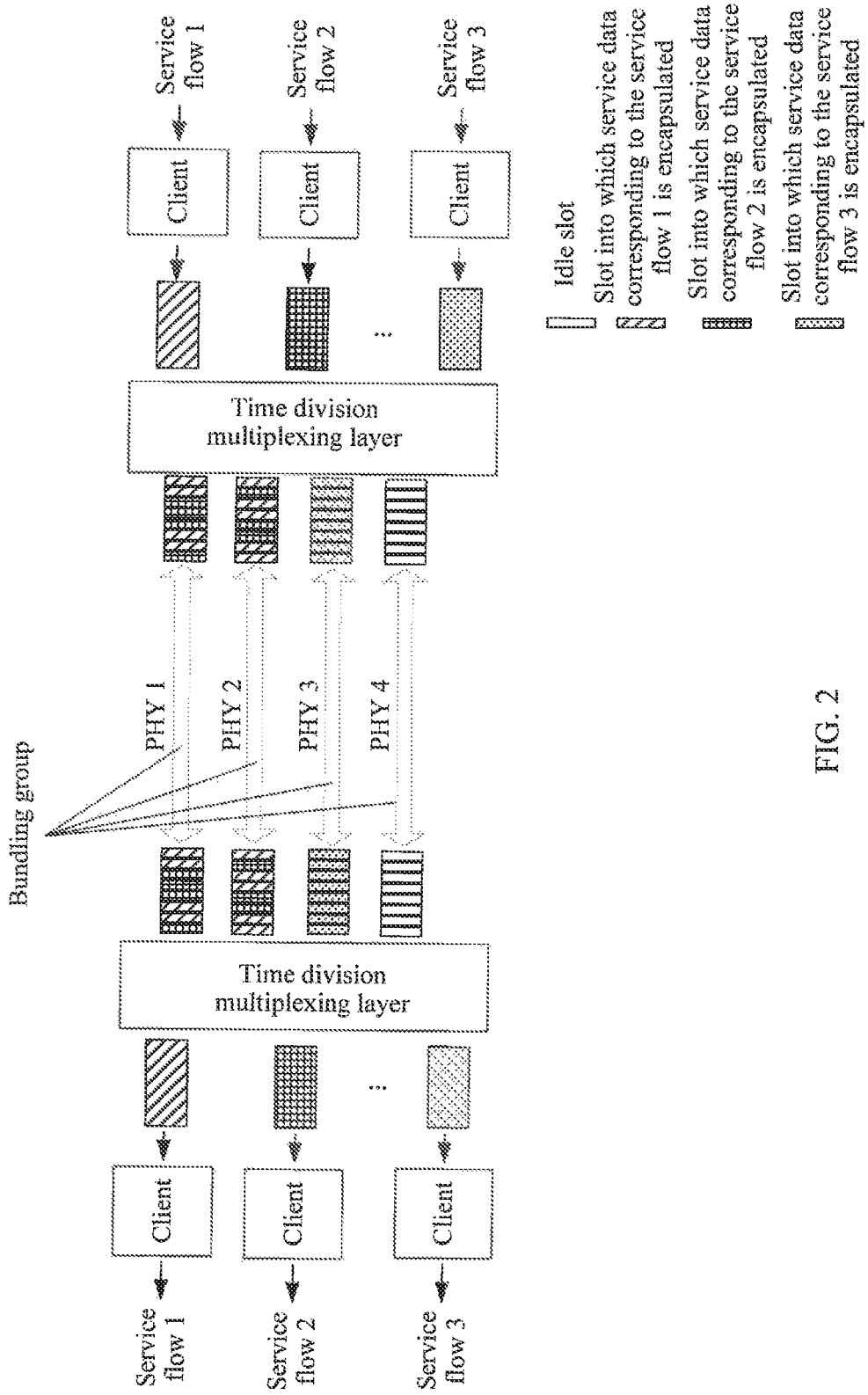
FIG. 2 is a diagram of an example of a conventional procedure of processing a flexible ethernet service flow.

The following describes, with reference to FIG. 2, an example of a conventional process of processing a flexible ethernet service flow.

FIG. 2 describes the process of processing the FlexE service flow.

As shown in FIG. 2, a bundling group includes PHYs 1 to 4, and the bundling group may be used to transmit a service flow 1, a service flow 2, and a service flow 3. A process of transmitting the service flow 1 is used as an example. On a transmit side, MAC layer information of the service flow 1 of a client may be encapsulated by using a media access control (Media Access Control, MAC) layer module, and then a MAC frame is converted into a 64b/66b format. The client sends service data obtained after processing to a time division multiplexing layer.

Then the time division multiplexing layer may perform slot arrangement on the received service data based on a preconfigured slot configuration table (that is, 64b/66b blocks corresponding to the service data are arranged in slots obtained through predivision). Further, a slot into which the service data of the service flow 1 is encapsulated is mapped to a PHY in a bundling group. As shown in FIG. 2, slots into which the service data of the service flow 1 is encapsulated are mapped to the PHY 1 and the PHY 2. Then the PHY in the bundling group may transmit the data to a receive end by using an optical module. The receive end reassembles, into a service flow based on a reverse process of a processing process at a transmit end, the data transmitted at the PHY in the bundling group.

Processing processes of the service flow 2 and the service flow 3 are similar to that of the service flow 1. Details are not described herein again.

If the service flow 1 and the service flow 2 need to pass through a forwarding node, the forwarding node further needs to perform corresponding operations on the transmit side and a receive side. It may be learned that, in such a single-hop parsing technology, the forwarding node of the service flow needs to reassemble data. Consequently, a processing delay is increased. Therefore, a concept of a FlexE slot forwarding path ("FlexE path" for short below) is put forward.

FlexE path: Nodes on the FlexE path are connected through a FlexE interface, a FlexE path forwarding table is established for a node on the FlexE path other than a source node and a destination node on the FlexE path, and these FlexE connections and the FlexE path forwarding table together constitute a FlexE path. A FlexE path forwarding table of a node is used to indicate a correspondence between one or more slots in a bundling group and one or more slots in another bundling group. Based on the correspondence, a forwarding plane of the node may map data carried in the one or more slots in the bundling group to the one or more slots in the another bundling group.

Figure 3:
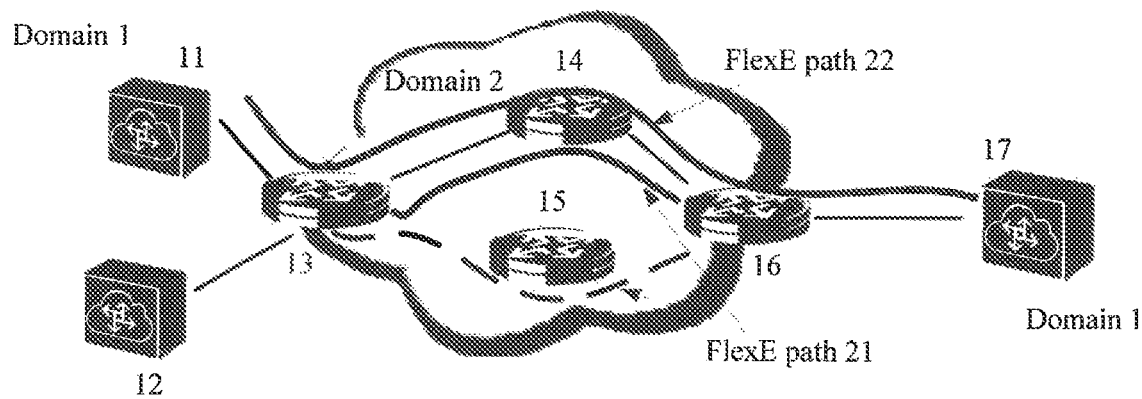
FIG. 3 is a schematic diagram of a system architecture applied to an embodiment of this application.

A FlexE path between a node 13 and a node 16 is used as an example, as shown in FIG. 3, FIG. 3 being a schematic diagram of an application scenario according to this application. The node 13 is connected to a node 14 through a FlexE interface, and the node 14 is connected to the node 16 through a FlexE interface. A FlexE path forwarding table of the node 14 is established, so that the node 14 may send a data service flow 1 based on the FlexE path forwarding table. For example, the FlexE path forwarding table of the node 14 may be shown in Table 1.

TABLE 1

| Inbound interface | Incoming slot | Outbound interface | Outcoming slot |
|---|---|---|---|
| Interface 1A | 6 and 9 | Interface 3A | 7 and 12 |

In Table 1, the interface 1A is a FlexE interface corresponding to a bundling group 1A between the node 13 and the node 14, and the interface 3A is a FlexE interface corresponding to a bundling group 3A between the node 14 and the node 16. When data is forwarded, the node 13 maps the service flow 1 to the slots 6 and 9 in the bundling group 1A for transmission, and the node 14 maps, to the slots 7 and 12 in the bundling group 3A between the node 14 and the node 16 for transmission according to Table 1, the service flow 1 transmitted by using the slots 6 and 9 in the bundling group 1 A, without reassembling data in the slots 6 and 9 in the bundling group 1A. After receiving the service flow 1 in the slots 7 and 12 in the bundling group 3A, the node 16 performs reassembling again, to recover the service flow 1.

As shown in FIG. 3, a node 11, a node 12, and a node 17 belonging to a domain 1 are connected to each other by using a domain 2, a node 13 and a node 16 are edge nodes (for example, a provider edge (PE) device), and a node 14 and a node 15 are intermediate nodes (for example, a provider (P) device). Nodes in the domain 2 are connected through a FlexE, the node 11 and the node 13 are connected through the FlexE, the node 12 and the node 13 are also connected through the FlexE, and the node 16 and the node 17 are connected through the FlexE. An end-to-end FlexE path 21 from the node 13 to the node 16 may be established to carry a service flow whose source node is the node 13 and destination node is the node 16 in the domain 2. If QoS of a service flow transmitted between the node 11 and the node 17 also needs to be ensured, an end-to-end FlexE path 22 whose source node is the node 11 and destination node is the node 17 may be established to carry the service flow. Nodes on the established FlexE path 22 may be successively the node 11, the node 13, the node 14, the node 16, and the node 17, or may be the node 11, the node 13, the node 15, the node 16, and the node 17. When the FlexE path 22 is established, an end-to-end FlexE path between the node 13 and the node 16 needs to be re-established. Therefore, nodes on the re-established FlexE path may be successively the node 13, the node 14, and the node 16, or may be successively the node 13, the node 15, and the node 16. When the service flow arrives at the node 13, the service flow is carried by using the established FlexE path whose source node is the node 13, intermediate node is the node 14, and destination node is the node 16, or by using the established FlexE path whose source node is the node 13, intermediate node is the node 15, and destination node is the node 16. In this way, a control plane of the node 13, the node 14, and the node 16 or a control plane of the node 13, the node 15, and the node 16 needs to maintain two FlexE paths (namely, the FlexE path 21 and the FlexE path 22). Consequently, management complexity of the control plane of the node 13, the node 14, and the node 16 and signaling overheads required for maintaining the FlexE paths are increased.

To reduce management complexity of a control plane of a node and signaling overheads required for maintaining a FlexE path, this application provides a FlexE path establishment method. The following describes a method embodiment of this application in detail below with reference to FIG. 4.

Figure 4:
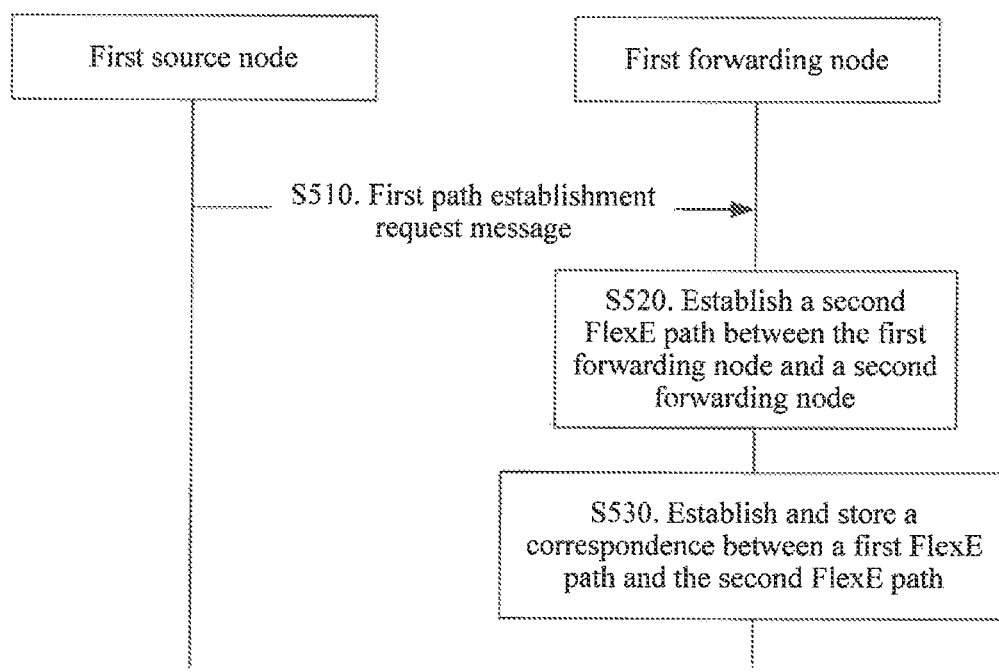
FIG. 4 is a schematic flowchart for establishing a flexible ethernet path according to an embodiment of this application.

FIG. 4 is a schematic flowchart of a FlexE path establishment method according to an embodiment of this application.

S510: A first forwarding node receives a first path establishment request message sent by a first source node. The first path establishment request message is used to establish a first FlexE path between the first source node and a first destination node, and the first FlexE path is used to transmit a first service flow. The first path establishment request message includes first routing information, and the first routing information is used to indicate information about a node on the first FlexE path. The first forwarding node on the first FlexE path is an upstream node of a second forwarding node on the first FlexE path.

Specifically, when the first source node needs to establish the FlexE path (namely, the first FlexE path) to transmit the first service flow, the first source node calculates the routing information of the first FlexE path, that is, nodes through which the first FlexE path needs to pass, and then encapsulates the routing information (namely, the first routing information) into the first path establishment request message. The first path establishment request message is sent to a next node along the FlexE path. For example, when the first forwarding node is a next node of the first source node, the first path establishment request message is sent by the first source node to the first forwarding node.

It should be understood that the first path establishment request message carries bandwidth requirement information of the first service flow, and the first forwarding node learns, based on the bandwidth requirement information of the first service flow, of a value of bandwidth required by the first service flow, so as to determine a quantity of slots required by the first service flow. For example, it is assumed that a value of bandwidth of a PHY is 100 G and the bandwidth is divided into 20 slots. If a value of bandwidth required by the first service flow is 10 G, a quantity of slots required by the first service flow is 2, in other words, the first service flow needs to be mapped to two slots.

It should be further understood that, if a FlexE path is an intra-domain FlexE path, in other words, nodes on the FlexE path are in a same domain, routing information sent by a source node may carry full routing information of the FlexE path, in other words, information about all nodes on the FlexE path. For example, when the first FlexE path is an intra-domain FlexE path, in other words, the first FlexE path is not an inter-domain FlexE path, the first forwarding node is the next node of the first source node, and the first forwarding node may learn, based on the first routing information, that the second forwarding node is a next node of the first forwarding node, and that a next node of the second forwarding node is the first destination node.

If a FlexE path is an inter-domain FlexE path, in other words, all nodes on the FlexE path are not in a same domain, routing information sent by a source node may carry partial routing information of the FlexE path, and the partial routing information may be used to indicate the source node, a destination node, and an edge node on the FlexE path. For example, when the first FlexE path is an inter-domain FlexE path, a source node of the first FlexE path is the first source node, a destination node is the first destination node, two edge nodes are respectively the first forwarding node and the second forwarding node, and the first forwarding node is the upstream node of the second forwarding node. The first forwarding node may independently determine routing information between the first forwarding node and the second forwarding node based on the first routing information and a bandwidth requirement of the first service flow, in other words, determine nodes on a path between the first forwarding node and the second forwarding node. The first forwarding node may independently determine the routing information between the first forwarding node and the second forwarding node by using a plurality of methods, for example, a shortest path method may be used.

Optionally, the first path establishment request message may further include path type information, and the path type information is used to indicate that a type of an established path is a FlexE path. In addition, it may also be specified in this embodiment of this application that a type of a path needing to be established by each node by default is a FlexE path.

Optionally, path establishment request messages such as the first path establishment request message and a second path establishment request message (to be used below) used in this application may be path messages in a resource reservation protocol (Resource Reservation Protocol-Traffic Engineering, RSVP), but are not limited to the path messages in this embodiment of this application.

S520: The first forwarding node establishes a second FlexE path between the first forwarding node and the second forwarding node based on the first path establishment request message, and deletes an established third FlexE path between the first forwarding node and the second forwarding node after the second FlexE path is established.

Specifically, before the first path establishment request message is received, if the first forwarding node has a requirement of transmitting a service flow (for example, the service flow is marked as a second service flow), the first forwarding node may establish the FlexE path (for example, the FlexE path is marked as the third FlexE path) between the first forwarding node and the second forwarding node, and transmits the second service flow by using the third FlexE path. After receiving the first path establishment request message, the first forwarding node may re-establish the FlexE path (for example, the FlexE path is marked as the second FlexE path) between the first forwarding node and the second forwarding node based on the bandwidth requirement of the first service flow and a bandwidth requirement of the second service flow, and after the second FlexE path is established, the first forwarding node switches a flow (namely, the second service flow) on the third FlexE path to the second FlexE path, and deletes the third FlexE path. In this way, the first service flow and the second service flow may be forwarded by using the second FlexE path.

Optionally, the second FlexE path reuses a session established when the third FlexE path is established, in other words, the second FlexE path and the third FlexE path correspond to a second session.

A session (session) (for example, the session is marked as the second session) is established while the third FlexE path is established. The second FlexE path may be established based on the second session, in other words, the second FlexE path corresponds to the second session. Interworking with the prior art to a greater extent can be performed by using such a method.

It should be understood that a session may be defined as a data flow at a specific destination address and in a specific transport protocol. For example, one session may be indicated by one triplet (a destination address, a protocol number, and a protocol port). For details of the destination address, the protocol number, and the protocol port, refer to the prior art. For brevity, details are not described herein.

In addition, when the second FlexE path is established, a session may be re-established. This is not limited in this embodiment of this application.

Optionally, a slot resource that is used to transmit the second service flow and that is on the second FlexE path is the same as a slot resource that is used to transmit the second service flow and that is on the third FlexE path.

In other words, a slot resource that is used to transmit the second service flow and that is in slot resources reserved by the second FlexE path is the same as a slot resource that is used to transmit the second service flow and that is in slot resources reserved by the third FlexE path.

S530: The first forwarding node establishes and stores a correspondence between the first FlexE path and the second FlexE path, so that the first service flow and the second service flow are mapped to a slot on the second FlexE path.

For example, the first forwarding node may establish the correspondence between the first FlexE path and the second FlexE path by establishing a table. When data is forwarded, when the first service flow forwarded by using the first FlexE path is received, the first forwarding node may forward the first service flow by using the second FlexE path based on the correspondence shown in the table. However, it should be understood that a form for representing the correspondence between the first FlexE path and the second FlexE path is not specifically limited in this application.

In the flexible ethernet path establishment method in this embodiment of this application, when the third FlexE path for transmitting the second service flow is established, if the first service flow further needs to be transmitted, the second FlexE path between the first forwarding node and the second forwarding node may be re-established, to converge the first service flow and the second service flow onto the second FlexE path for forwarding, and the third FlexE path is deleted. In this way, a quantity of FlexE paths established between the first forwarding node and the second forwarding node can be reduced, so that a quantity of FlexE paths needing to be maintained by a control plane of the first forwarding node and the second forwarding node can be reduced, and management complexity of the control plane of the first forwarding node and the second forwarding node and signaling overheads required for maintaining the FlexE paths can be reduced.

Optionally, that the first forwarding node establishes and stores the correspondence between the first FlexE path and the second FlexE path in step S530 includes:

sending, by the first forwarding node, a second path establishment request message to a next node of the first forwarding node on the second FlexE path, where the second path establishment request message includes second routing information, and the second routing information is used to indicate information about a node on the second FlexE path, so that the next node of the first forwarding node sends the second path establishment request message based on the second routing information; receiving, by the first forwarding node, a second resource reservation message that is sent by the next node of the first forwarding node based on the second path establishment request message; and determining, by the first forwarding node, a first slot resource on the second FlexE path based on the second resource reservation message, and establishing and storing a correspondence among the first slot resource, the first FlexE path, and the second FlexE path, so that the first service flow carried on the first FlexE path is mapped to a slot corresponding to the first slot resource.

Specifically, after receiving the first path establishment request message, the first forwarding node pauses sending of the first path establishment request message, and sends the second path establishment request message to the next node (for example, the next node is marked as an intermediate forwarding node) of the first forwarding node, to request establishment of the second FlexE path. The intermediate forwarding node sends the second path establishment request message to a next node in a direction of the second FlexE path based on the second routing information, until the second path establishment request message arrives at the second forwarding node.

After receiving the second path establishment request message, the second forwarding node sends the second resource reservation message in response to the second path establishment request message in a reverse direction of the second FlexE path, and nodes in the reverse direction of the second FlexE path reserve resources based on the second resource reservation message. After the first forwarding node receives the second resource reservation message sent by the intermediate forwarding node, the first forwarding node may determine the first slot resource. Herein, the first slot resource includes a slot resource used by the first forwarding node to forward the first service flow. For example, the first slot resource includes slots 15 and 16 on an interface 1A. When a service flow is forwarded, the first forwarding node may map the first service flow to the slots 15 and 16 on the interface 1A for transmission.

Subsequently or at the same time, the first forwarding node establishes and stores the correspondence among the first slot resource, the first FlexE path, and the second FlexE path. In this way, when a service flow is forwarded, the first forwarding node may map the first service flow carried on the first FlexE path to the slot corresponding to the first slot resource for transmission.

For example, the first forwarding node may store, by establishing a mapping table shown in Table 2, the correspondence among the first slot resource, the first FlexE path, and the second FlexE path.

TABLE 2

| Ingress FlexE path | Egress FlexE path | Outbound interface | Outcoming slot |
| --- | --- | --- | --- |
| First FlexE path | Second FlexE path | Interface 1A | 15 and 16 |

Referring to Table 2, the first slot resource includes the slots 15 and 16 on the interface 1A. When a service flow is forwarded, after receiving the first service flow carried on the first FlexE path, the first forwarding node may map the first service flow to the slots 15 and 16 on the interface 1A for transmission.

It should be understood that Table 2 indicates only a representation form of the correspondence among the first slot resource, the first FlexE path, and the second FlexE path. The first forwarding node may further store the correspondence among the first slot resource, the first FlexE path, and the second FlexE path in another manner or form. For example, the first forwarding node may further store the correspondence among the first slot resource, the first FlexE path, and the second FlexE path by establishing two tables. A specific form in which the first forwarding node stores the correspondence among the first slot resource, the first FlexE path, and the second FlexE path is not specifically limited in this embodiment of this application.

Optionally, resource reservation messages such as a first resource reservation message and the second resource reservation message (to be used below) used in this application may be resv messages in RSVP, but are not limited to the resv messages in this embodiment of this application.

A specific embodiment of establishing a second FlexE path is described in detail below with reference to FIG. 5.

Figure 5:
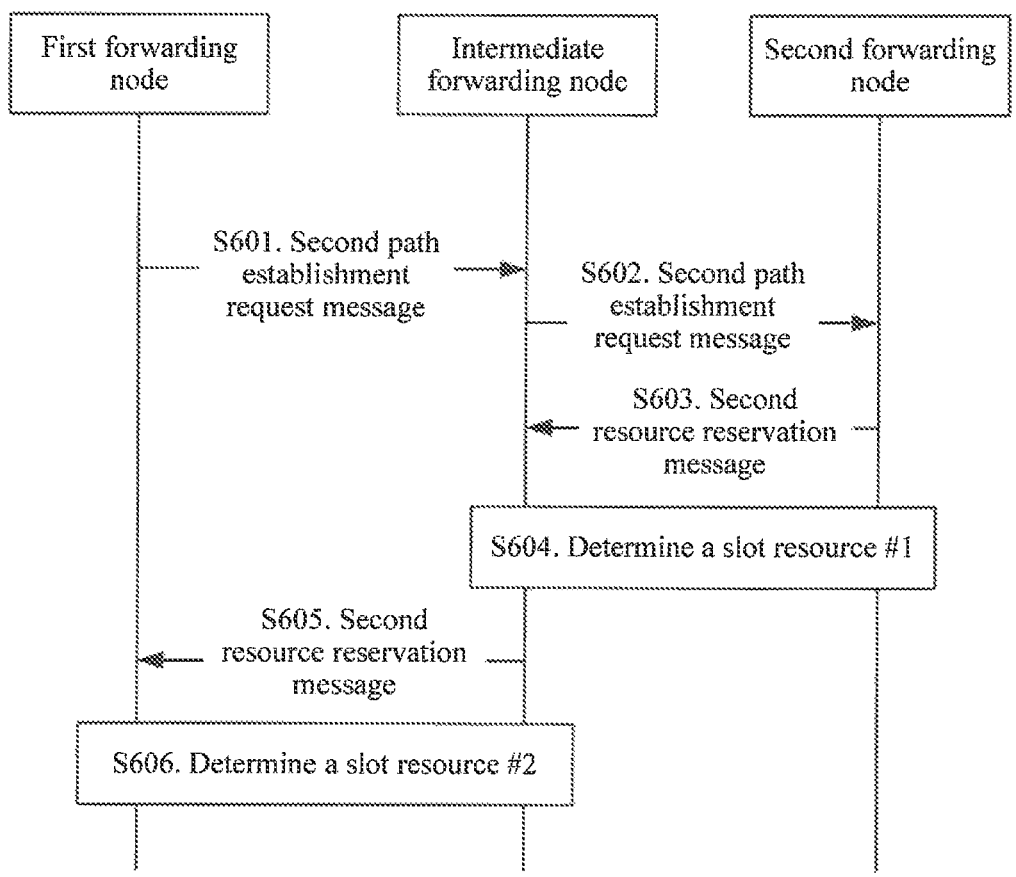
FIG. 5 is a schematic flowchart for establishing a flexible ethernet path according to an embodiment of this application.

It should be noted that, in the embodiment shown in FIG. 5, a slot resource that is used to transmit a second service flow and that is on the second FlexE path is the same as a slot resource that is used to transmit the second service flow and that is on a third FlexE path. Therefore, each node needs to determine only a slot resource used to transmit a first service flow.

S601: A first forwarding node sends a second path establishment request message to an intermediate forwarding node.

Specifically, after receiving a first path establishment request message, the first forwarding node pauses sending of the first path establishment request message, and sends the second path establishment request message to the intermediate forwarding node, to request to establish the second FlexE path. The second path establishment request message may carry bandwidth requirement information and second routing information. The bandwidth requirement information is used to indicate a bandwidth requirement of the first service flow and a bandwidth requirement of the second service flow, and the second routing information indicates information about a node on the second FlexE path.

S602: After receiving the second path establishment request message, the s18 intermediate forwarding node sends the second path establishment request message to a second forwarding node in a direction of the second FlexE path.

S603: After receiving the second path establishment request message, the second forwarding node sends a second resource reservation message in response to the second path establishment request message to the intermediate forwarding node in a reverse direction of the second FlexE path.

S604: The intermediate forwarding node determines a slot resource #1 based on the second resource reservation message, and instructs the second forwarding node to modify a FlexE configuration on an inbound interface of the second forwarding node based on the slot resource #1, so that the first service flow may be mapped to the slot resource #1 for transmission.

It should be understood that the slot resource #1 is a slot resource used by the intermediate forwarding node to forward the first service flow, that is, a FlexE configuration on an outbound interface of the intermediate forwarding node. For example, the slot resource #1 may be slots 8 and 10 on an interface 3A. When a service flow is forwarded, the intermediate forwarding node maps the first service flow to the slots 8 and 10 on the interface 3A for transmission.

In step S604, optionally, the second resource reservation message sent by the second forwarding node to the intermediate forwarding node may carry indication information of the slot resource #1, and the indication information of the slot resource #1 is used to indicate the slot resource #1 determined by the intermediate forwarding node. Specifically, after receiving the second path establishment request message, the second forwarding node searches an idle slot to determine the slot resource #1 from the idle slot, and then notifies the slot resource #1 to the intermediate forwarding node based on the indication information of the slot resource #1.

Further, the indication information may be a generalized multiprotocol label switching (GMPLS) label, and the GMPLS label is used to indicate the slot resource #1. It should be understood that the GMPLS label may also indicate the above slot resource that is used to transmit the second service flow and that is on the third FlexE path. It should be understood that in this application, the indication information is not limited to being the GMPLS label.

In step S604, optionally, the intermediate forwarding node may determine the slot resource #1. Specifically, the second forwarding node requests, by using the second resource reservation message, the intermediate forwarding node to determine the slot resource #1. After receiving the second resource reservation message, the intermediate forwarding node searches an idle slot to determine the slot resource #1 from the idle slot.

After the slot resource #1 is determined in, for example, the foregoing two possible implementations, the first forwarding node may modify a FlexE configuration on an inbound interface of the intermediate forwarding node by using an in-band control channel between the first forwarding node and the intermediate forwarding node, so as to modify a slot configuration of the second FlexE path.

S605: The intermediate forwarding node sends the second resource reservation message to the first forwarding node.

S606: The first forwarding node determines a slot resource #2 (namely, an example of the first slot resource) based on the second resource reservation message, and instructs the intermediate forwarding node to modify the FlexE configuration on the inbound interface of the intermediate forwarding node based on the slot resource #2, so that the first service flow may be mapped to the slot resource #2 for transmission.

It should be understood that the slot resource #2 is a slot resource used by the first forwarding node to forward the first service flow. For example, the slot resource #2 may be slots 15 and 16 on an interface 1A. When a service flow is forwarded, the intermediate forwarding node maps the first service flow to the slots 15 and 16 on the interface 1A for transmission.

It should be further understood that, for a specific implementation of step S606, refer to the foregoing descriptions of step S604. For brevity, details are not described herein again.

In addition, the intermediate forwarding node may establish, based on the FlexE configuration on the inbound interface and the FlexE configuration on the outbound interface, a slot forwarding table shown in Table 3.

TABLE 3

| Inbound interface | Incoming slot | Outbound interface | Outcoming slot |
|---|---|---|---|
| Interface 1A | 15 and 16 | Interface 3A | 8 and 10 |

According to Table 3, when a service flow is forwarded, the intermediate forwarding node may map the first service flow received in the slots 15 and 16 on the interface 1A to the slots 8 and 10 on the interface 3A for transmission.

S607: The first forwarding node establishes and stores the mapping table shown in Table 2.

In this way, when a service flow is forwarded, the first forwarding node may map the first service flow to a slot corresponding to the slot resource #2 for transmission. After receiving the first service flow from the slot resource #2, the intermediate forwarding node maps the first service flow to a slot corresponding to the slot resource #1 for transmission.

In this embodiment of this application, after establishing the second FlexE path, the first forwarding node continues to send the first path establishment request message in a direction of the first FlexE path.

Optionally, after the first path establishment request message arrives at the second forwarding node, for an operation performed by the second forwarding node, refer to operations performed by the first forwarding node in the following to-be-described embodiment.

Optionally, in an embodiment of this application, the method may further include: receiving, by the first forwarding node, a third path establishment request message, where the third path establishment request message is used to establish a fourth FlexE path between a second source node and a second destination node, the fourth FlexE path is used to transmit a third service flow, the third path establishment request message includes third routing information, the third routing information is used to indicate information about a node on the fourth FlexE path, and a next node of the first forwarding node on the fourth FlexE path is the second destination node; sending, by the first forwarding node, the third path establishment request message to the second destination node; receiving, by the first forwarding node, a third resource reservation message that is sent by the second destination node based on the third path establishment request message; determining, by the first forwarding node, a third slot resource based on the third resource reservation message; and establishing and storing, by the first forwarding node, a correspondence between the third slot resource and a fourth slot resource on a fifth FlexE path, so that the first forwarding node maps, to a slot corresponding to the third slot resource, the third service flow mapped to a slot corresponding to the fourth slot resource, where the fifth FlexE path is a FlexE path between the second forwarding node and the first forwarding node, and the slot corresponding to the third slot resource is a slot that is used to transmit the third service flow and that is on the fifth FlexE path.

Specifically, when the FlexE path (namely, the fourth FlexE path) between the second destination node and the second source node is established, when the fifth FlexE path between the second forwarding node and the first forwarding node is established, the second forwarding node sends the third path establishment request message in a direction of the fourth FlexE path, and the first forwarding node sends the third path establishment request message to a next node (namely, a first source node) after the third path establishment request message arrives at the first forwarding node. After receiving the third path establishment request message, the first source node sends the third resource reservation message to the first forwarding node, to request the first forwarding node to reserve a resource. The first forwarding node reserves, based on the third resource reservation message, the third slot resource as the slot resource for transmitting the third service flow. In addition, the first forwarding node establishes and stores the correspondence between the third slot resource and the fourth slot resource on the fifth FlexE path. In this way, when a service flow is forwarded, the first forwarding node may map, based on the correspondence, the third service flow to the slot corresponding to the third slot resource for transmission, where the third service flow is mapped from a previous node of the first source node on the fourth FlexE path to the slot corresponding to the fourth slot resource.

Herein, the second destination node may be the first source node in the specification, and the second source node may be the first destination node in the specification.

Referring to the foregoing embodiment, in a process of establishing the first FlexE path, after the first path establishment request message arrives at the second forwarding node, the second forwarding node continues to send the first path establishment request message to a next node along the first FlexE path. If the next node of the second forwarding node is the first destination node, after the first destination node receives the first path establishment request message, the first destination node sends a first resource reservation message in response to the first path establishment request message to the second forwarding node. The second forwarding node determines an available slot resource (for example, the available slot resource is marked as a fifth slot resource) based on the first resource reservation message, and instructs the first destination node to modify a FlexE configuration on an inbound interface of the first destination node based on the fifth slot resource. In addition, the second forwarding node stores a correspondence between the fifth slot resource and a sixth slot resource (to be specific, a slot used by a previous node of the second forwarding node on the second FlexE path to send the first service flow, for example, the slot resource #1). In this way, when the first service flow is forwarded, the second forwarding node may map, to the fifth slot resource for sending, the first service flow transmitted in a slot corresponding to the sixth slot resource.

For example, in which the sixth slot resource is the slot resource #1 and the fifth slot resource is slots 17 and 27 on an interface 2C between the second forwarding node and the first destination node, the second forwarding node may store the correspondence between the fifth slot resource and the sixth slot resource by establishing a mapping table shown in Table 4.

TABLE 4

| Ingress FlexE path | Inbound interface | Incoming slot | Egress FlexE path | Outbound interface | Outcoming slot |
| --- | --- | --- | --- | --- | --- |
| Second FlexE path | Interface 3A | 8 and 10 | First FlexE path | 2C | 17 and 27 |

Referring to Table 5, when data is forwarded, the second forwarding node may map, to the slots 17 and 27 on the outbound interface 2C for transmission, a first service flow carried in the slots 8 and 10 on the inbound interface 3A.

It should be understood that Table 5 is only a representation form indicating the correspondence between the fifth slot resource and the sixth slot resource. The second forwarding node may further store the correspondence between the fifth slot resource and the sixth slot resource in another manner or form. For example, the second forwarding node may further store the correspondence between the fifth slot resource and the sixth slot resource by establishing two tables. A specific form in which the second forwarding node stores the correspondence between the fifth slot resource and the sixth slot resource is not specifically limited in this embodiment of this application.

After the second forwarding node establishes and stores the correspondence between the fifth slot resource and the sixth slot resource, the second forwarding node continues to send the first resource reservation message in a reverse direction of the first FlexE path.

If a previous node of the first forwarding node is the first source node, the first forwarding node sends the first resource reservation message to the first source node after the first resource reservation message arrives at the first forwarding node. After receiving the first resource reservation message, the first source node determines a second slot resource, and instructs the first forwarding node to configure a FlexE configuration on an inbound interface of the first forwarding node based on the second slot resource, to establish the first FlexE path. While the FlexE configuration on the inbound interface of the first forwarding node is configured or after the FlexE configuration on the inbound interface of the first forwarding node is configured, the first forwarding node stores a correspondence between the second slot resource and the first slot resource. In this way, when data is forwarded, the first forwarding node may map, to a slot corresponding to the first slot resource and based on the correspondence between the second slot resource and the first slot resource, a first service flow mapped to a slot corresponding to the second slot resource.

For example, second slot resources may be slots 3 and 7 on an interface 1B between the first source node and the first forwarding node. The first forwarding node may store the correspondence between the second slot resource and the first slot resource by establishing a forwarding table shown in Table 5.

TABLE 5

| Inbound interface | Incoming slot | Outbound interface | Outcoming slot |
|---|---|---|---|
| Interface 1B | 3 and 7 | Interface 1A | 15 and 16 |

Referring to Table 5, a forwarding plane of the first source node may map the first service flow to the slots 3 and 7 on the interface 1B for transmission, and the first forwarding node maps the first service flow carried in the slots 3 and 7 on the interface 1B to the slots 15 and 16 on the interface 1A for transmission.

It should be understood that Table 5 is only a representation form of the correspondence between the first slot resource and the second slot resource. The first forwarding node may further store the correspondence between the first slot resource and the second slot resource in another manner or form. For example, the first forwarding node may further store the correspondence between the first slot resource and the second slot resource by establishing two or more tables. A specific form in which the first forwarding node stores the correspondence between the first slot resource and the second slot resource is not specifically limited in this embodiment of this application.

It should be further understood that the first forwarding node may combine Table 2 and Table 5 as one table for storage. The one table may be simple assembly of the two tables, or may be a table obtained after the same content in Table 2 and Table 3 is combined. This is not limited in this embodiment of this application.

Figure 6:
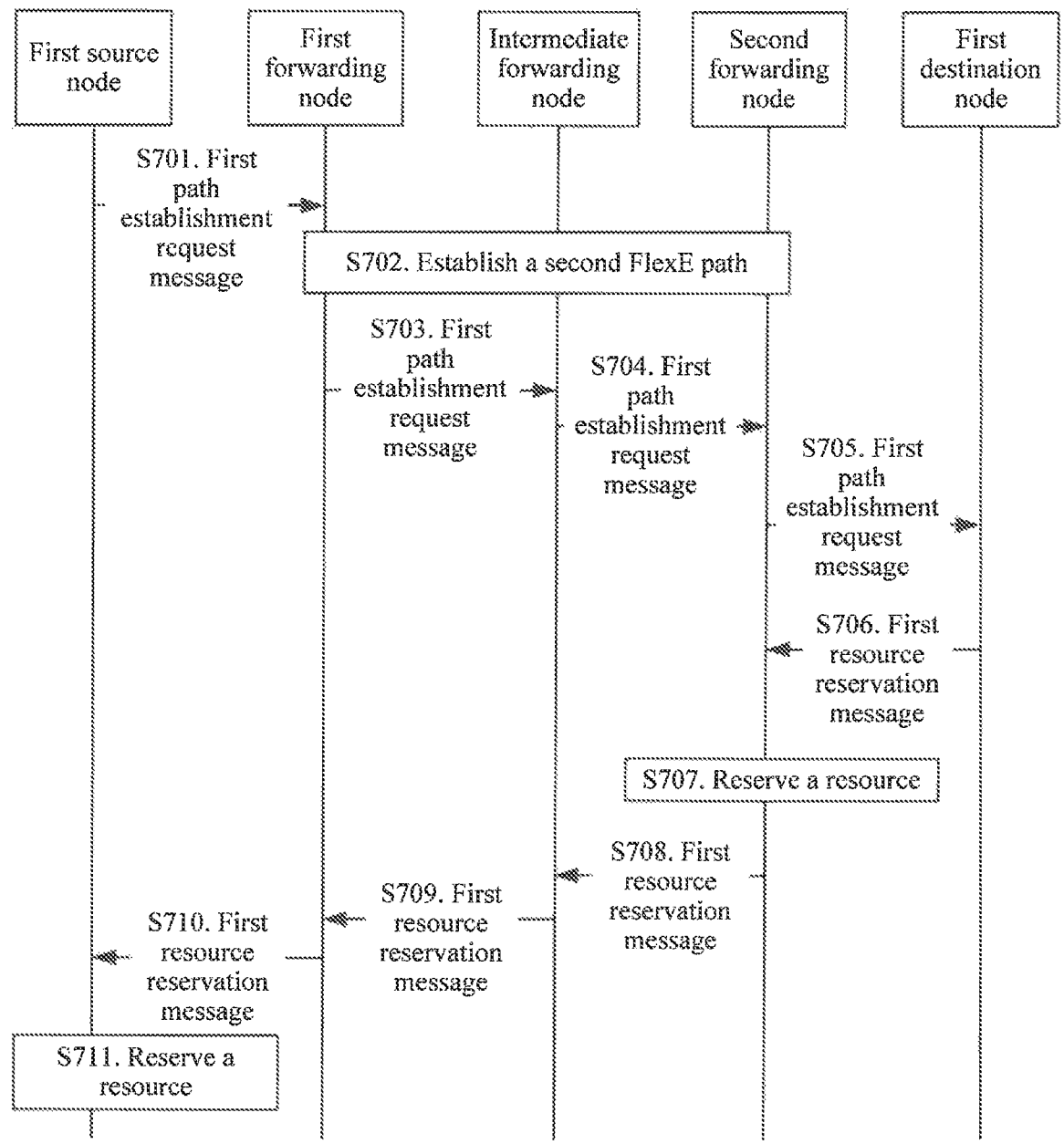
FIG. 6 is a schematic flowchart for establishing a flexible ethernet path according to another embodiment of this application.

The following describes an embodiment of a FlexE path establishment method in this application in detail with reference to FIG. 6. It should be understood that a first source node, a first forwarding node, an intermediate forwarding node, a second forwarding node, and a first destination node in the method shown in FIG. 6 may respectively correspond to the nodes 11, 13, 14, 16, and 17 in the scenario shown in FIG. 3.

FIG. 6 is a schematic interaction diagram of a FlexE path establishment method according to a specific embodiment of this application.

S701: The first source node sends a first path establishment request message to the first forwarding node, where the first path establishment request message includes bandwidth requirement information of a first service flow and first routing information.

S702: The first forwarding node may learn, based on the first routing information, that a FlexE path passing from the first forwarding node to the second forwarding node needs to be established, and determine whether a FlexE path is established between the first forwarding node and the second forwarding node. If the FlexE path, namely, a third FlexE path, is established, the first forwarding node determines whether there are sufficient slot resources meeting a bandwidth requirement of the first service flow. If there are sufficient slot resources meeting the bandwidth requirement of the first service flow, the first forwarding node pauses sending of the first path establishment request message, and establishes a second FlexE path between the first forwarding node and the second forwarding node.

In a specific embodiment, the second FlexE path may be established with reference to the method shown in FIG. 5. For brevity, details are not described herein again.

After the second FlexE path is established, the third FlexE path is deleted. In this way, each node does not need to maintain the third FlexE path.

S703: After establishing the second FlexE path, the first forwarding node sends the first path establishment request message in a direction of a first FlexE path.

S704: After receiving the first path establishment request message, the intermediate forwarding node sends the first path establishment request message to the second forwarding node.

S705: After receiving the first path establishment request message, the second forwarding node sends the first path establishment request message to the first destination node.

S706: After determining that an available slot of the first destination node meets the bandwidth requirement of the first service flow, the first destination node sends a first resource reservation message to the second forwarding node.

S707: The second forwarding node reserves a resource based on the first resource reservation message.

Specifically, the second forwarding node determines, based on the first resource reservation message, a fifth slot resource used to transmit the first service flow between the second forwarding node and the first destination node, for example, slots 17 and 27 on an outbound interface 2C, and instructs the first destination node to modify a FlexE configuration on an inbound interface of the first destination node. The second forwarding node may further store a correspondence between the fifth slot resource and a sixth slot resource by establishing the forwarding table shown in Table 4.

Correspondingly, the first destination node modifies the FlexE configuration on the inbound interface according to an indication of the second forwarding node.

S708: The second forwarding node sends the first resource reservation message in a reverse direction of the first FlexE path.

S709: After receiving the first resource reservation message, the intermediate forwarding node continues to send the first resource reservation message to the first forwarding node.

S710: The first forwarding node sends the first resource reservation message to the first source node.

S711: After receiving the first resource reservation message sent by the first forwarding node, the first source node reserves a resource.

Specifically, the first source node determines a second slot resource used to transmit the first service flow between the first source node and the first forwarding node, for example, slots 3 and 7 on an interface 1B, and instructs the first forwarding node to modify a FlexE configuration on an inbound interface of the first forwarding node.

Correspondingly, the first forwarding node modifies the FlexE configuration on the inbound interface according to an indication of the first source node, and establishes a mapping relationship between the second slot resource and the first slot resource.

In this way, establishment of the first FlexE path is completed. Then, when a service flow is forwarded, the first service flow may be forwarded according to the mapping tables/forwarding tables shown in Table 2 to Table 5.

It should be understood that a second service flow may be forwarded according to the slot mapping table established and stored when the third FlexE path is established above. This application is not limited thereto.

In the flexible ethernet path establishment method in this embodiment of this application, when the third FlexE path for transmitting the second service flow is established, if the first service flow further needs to be transmitted, the second FlexE path between the first forwarding node and the second forwarding node may be re-established, to converge the first service flow and the second service flow onto the second FlexE path for forwarding, and the third FlexE path is deleted. In this way, a quantity of FlexE paths established between the first forwarding node and the second forwarding node can be reduced, so that a quantity of FlexE paths needing to be maintained by a control plane of the first forwarding node and the second forwarding node can be reduced, and management complexity of the control plane of the first forwarding node and the second forwarding node and signaling overheads required for maintaining the FlexE paths can be reduced.

The following describes apparatus embodiments of this application. The apparatus embodiments may be used to perform the foregoing methods. Therefore, for a part that is not described in detail, refer to the foregoing method embodiments.

Figure 7:
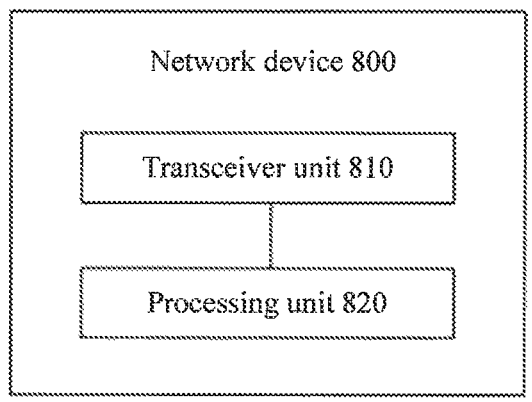
FIG. 7 is a schematic structural diagram of a network device according to an embodiment of this application.

FIG. 7 is a schematic structural diagram of a network device 800 according to an embodiment of this application. The network device 800 shown in FIG. 7 includes a transceiver unit 810 and a processing unit 820.

The transceiver unit 810 is configured to receive a first path establishment request message sent by a first source node, where the first path establishment request message is used to establish a first FlexE path between the first source node and a first destination node, the first FlexE path is used to transmit a first service flow, the first path establishment request message includes first routing information, the first routing information is used to indicate information about a node on the first FlexE path, and a first forwarding node on the first FlexE path is an upstream node of a second forwarding node on the first FlexE path.

The processing unit 820 is configured to: establish a second FlexE path between the first forwarding node and the second forwarding node based on the first path establishment request message, and delete an established third FlexE path between the first forwarding node and the second forwarding node after the second FlexE path is established, where the third FlexE path is used to transmit a second service flow, and the second FlexE path can meet a bandwidth requirement of the first service flow and a bandwidth requirement of the second service flow.

The processing unit 820 is further configured to establish and store a correspondence between the first FlexE path and the second FlexE path, so that the first service flow and the second service flow are mapped to a slot on the second FlexE path.

It should be understood that the units in the network device 800 are separately configured to perform actions or processing processes performed by the first forwarding node (for example, a PE device) in each of the foregoing methods. Herein, to avoid redundancy, detailed descriptions thereof are omitted.

It should be further understood that the network device 800 may also be the second forwarding node in this embodiment of this application.

Figure 8:
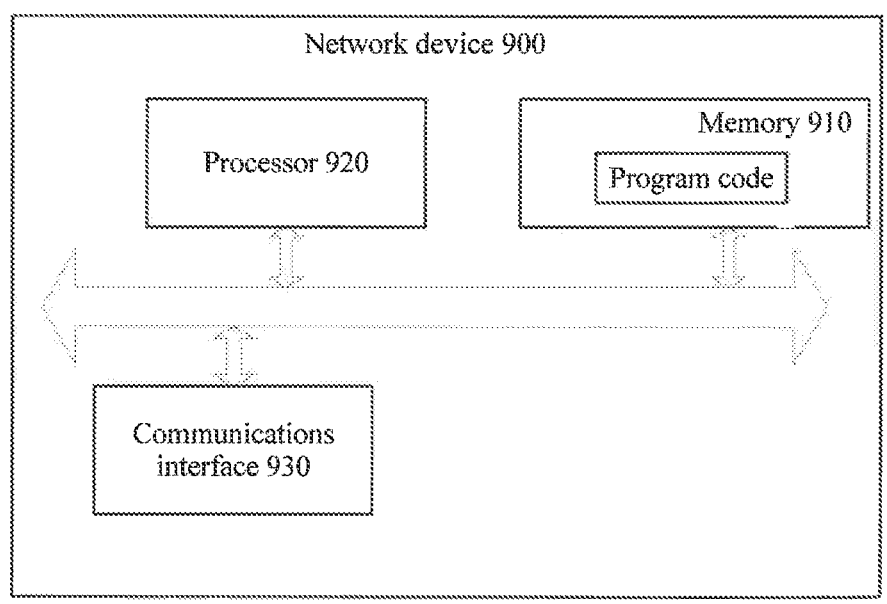
FIG. 8 is a schematic structural diagram of a network device according to another embodiment of this application.

FIG. 8 is a schematic structural diagram of a network device 900 according to another embodiment of this application. The network device 900 for establishing a flexible ethernet path in FIG. 8 includes a memory 910, a processor 920, and a communications interface 930. The memory 910, the processor 920, and the communications interface 930 communicate with each other and transmit a control and/or data signal by using an internal connection path. The processor 920 corresponds to the processing unit 820 in FIG. 7. In other words, the processor 920 can perform the operations performed by the processing unit 820 in FIG. 7. The communications interface 930 corresponds to the transceiver unit 810 in FIG. 7. In other words, the communications interface 930 can perform the operations performed by the transceiver unit 810 in FIG. 7. The following describes the memory 910, the processor 920, and the communications interface 930 in detail.

The memory 910 is configured to store program code.

The processor 920 is configured to execute the program code stored in the memory 910, and when the program code is executed, the communications interface 930 is configured to receive a first path establishment request message sent by a first source node, where the first path establishment request message is used to establish a first FlexE path between the first source node and a first destination node, the first FlexE path is used to transmit a first service flow, the first path establishment request message includes first routing information, the first routing information is used to indicate information about a node on the first FlexE path, and a first forwarding node on the first FlexE path is an upstream node of a second forwarding node on the first FlexE path.

The processing unit 920 is configured to: establish a second FlexE path between the first forwarding node and the second forwarding node based on the first path establishment request message, and delete an established third FlexE path between the first forwarding node and the second forwarding node after the second FlexE path is established, where the third FlexE path is used to transmit a second service flow, and the second FlexE path can meet a bandwidth requirement of the first service flow and a bandwidth requirement of the second service flow.

The processing unit 920 is further configured to: establish and store a correspondence between the first FlexE path and the second FlexE path, so that the first service flow and the second service flow are mapped to a slot on the second FlexE path.

It should be understood that the units in the network device 900 are separately configured to perform actions or processing processes performed by the first forwarding node in each of the foregoing methods. Herein, to avoid redundancy, detailed descriptions thereof are omitted.

It should be understood that the network device 900 may be a network device in a flexible ethernet, for example, may be a routing device in the flexible ethernet, or may be a board in the routing device.

The embodiments of this application may be applied to a processor, or implemented by a processor. The processor may be an integrated circuit chip and has a signal processing capability. In an implementation process, the steps in the foregoing method embodiments may be implemented by using a hardware integrated logic circuit in the processor, or by using instructions in a form of software. The foregoing processor may be a central processing unit (central processing unit, CPU), or may be another general purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and software in the decoding processor. A software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be further understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DRRAM). It should be noted that the memory of the systems and methods described in this specification includes but is not limited to these and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A flexible ethernet (FlexE) path establishment method, comprising:
   receiving, by a first forwarding node, a first path establishment request message sent by a first source node, wherein the first path establishment request message is used to establish a first FlexE path between the first source node and a first destination node, the first FlexE path is used to transmit a first service flow, the first path establishment request message comprises first routing information, the first routing information is used to indicate information about a node on the first FlexE path, and the first forwarding node on the first FlexE path is an upstream node of a second forwarding node on the first FlexE path;
   establishing, by the first forwarding node, a second FlexE path between the first forwarding node and the second forwarding node based on the first path establishment request message, and deleting an established third FlexE path between the first forwarding node and the second forwarding node after the second FlexE path is established, wherein the third FlexE path is used to transmit a second service flow, and the second FlexE path meets a bandwidth requirement of the first service flow and a bandwidth requirement of the second service flow; and
   establishing and storing, by the first forwarding node, a correspondence between the first FlexE path and the second FlexE path, so that the first service flow and the second service flow are mapped to a slot on the second FlexE path.

2. The method according to claim 1, wherein the second FlexE path reuses a session established when the third FlexE path is established.

3. The method according to claim 1, wherein a slot resource that is used to transmit the second service flow and that is on the second FlexE path is the same as a slot resource that is used to transmit the second service flow and that is on the third FlexE path.

4. The method according to claim 1, wherein the establishing and storing, by the first forwarding node, the correspondence between the first FlexE path and the second FlexE path comprises:
   sending, by the first forwarding node, a second path establishment request message to a next node of the first forwarding node on the second FlexE path, wherein the second path establishment request message comprises second routing information, and the second routing information is used to indicate information about a node on the second FlexE path, so that the next node of the first forwarding node sends the second path establishment request message based on the second routing information;
   receiving, by the first forwarding node, a second resource reservation message that is sent by the next node of the first forwarding node based on the second path establishment request message; and
   determining, by the first forwarding node, a first slot resource on the second FlexE path based on the second resource reservation message, and establishing and storing a correspondence among the first slot resource, the first FlexE path, and the second FlexE path, so that the first service flow carried on the first FlexE path is mapped to a slot corresponding to the first slot resource.

5. The method according to claim 1, wherein the method further comprises:
   receiving, by the first forwarding node, a third path establishment request message, wherein the third path establishment request message is used to establish a fourth FlexE path between a second source node and a second destination node, the fourth FlexE path is used to transmit a third service flow, the third path establishment request message comprises third routing information, the third routing information is used to indicate information about a node on the fourth FlexE path, and a next node of the first forwarding node on the fourth FlexE path is the second destination node;
   sending, by the first forwarding node, the third path establishment request message to the second destination node;
   receiving, by the first forwarding node, a third resource reservation message that is sent by the second destination node based on the third path establishment request message;
   determining, by the first forwarding node, a third slot resource based on the third resource reservation message; and
   establishing and storing, by the first forwarding node, a correspondence between the third slot resource and a fourth slot resource on a fifth FlexE path, so that the first forwarding node maps, to a slot corresponding to the third slot resource, the third service flow mapped to a slot corresponding to the fourth slot resource, wherein the fifth FlexE path is a FlexE path between the second forwarding node and the first forwarding node, and the slot corresponding to the third slot resource is a slot that is used to transmit the third service flow and that is on the fifth FlexE path.

6. A non-transitory computer-readable storage medium, comprising a computer program, wherein when the computer program is run on a computer, the computer is enabled to perform the method according to claim 1.

7. A network device, comprising:
   a communication interface, configured to receive a first path establishment request message sent by a first source node, wherein the first path establishment request message is used to establish a first flexible ethernet (FlexE) path between the first source node and a first destination node, the first FlexE path is used to transmit a first service flow, the first path establishment request message comprises first routing information, the first routing information is used to indicate information about a node on the first FlexE path, and a first forwarding node on the first FlexE path is an upstream node of a second forwarding node on the first FlexE path; and a processor coupled to the communication interface and configured to:

establish a second FlexE path between the first forwarding node and the second forwarding node based on the first path establishment request message, and delete an established third FlexE path between the first forwarding node and the second forwarding node after the second FlexE path is established, wherein the third FlexE path is used to transmit a second service flow, and the second FlexE path meets a bandwidth requirement of the first service flow and a bandwidth requirement of the second service flow;

establish and store a correspondence between the first FlexE path and the second FlexE path, so that the first service flow and the second service flow are mapped to a slot on the second FlexE path.

8. The network device according to claim 7, wherein the second FlexE path reuses a session established when the third FlexE path is established.

9. The network device according to claim 7, wherein a slot resource that is used to transmit the second service flow and that is on the second FlexE path is the same as a slot resource that is used to transmit the second service flow and that is on the third FlexE path.

10. The network device according to claim 7, wherein the communication interface is configured to:

send a second path establishment request message to a next node of the first forwarding node on the second FlexE path, wherein the second path establishment request message comprises second routing information, and the second routing information is used to indicate information about a node on the second FlexE path, so that the next node of the first forwarding node sends the second path establishment request message based on the second routing information; and receive a second resource reservation message that is sent by the next node of the first forwarding node based on the second path establishment request message; and the processor is configured to: determine a first slot resource on the second FlexE path based on the second resource reservation message, and establish and store a correspondence among the first slot resource, the first FlexE path, and the second FlexE path, so that the first service flow carried on the first FlexE path is mapped to a slot corresponding to the first slot resource.

11. The network device according to claim 7, wherein the communication interface is further configured to:

receive a third path establishment request message, wherein the third path establishment request message is used to establish a fourth FlexE path between a second source node and a second destination node, the fourth FlexE path is used to transmit a third service flow, the third path establishment request message comprises third routing information, the third routing information is used to indicate information about a node on the fourth FlexE path, and a next node of the first forwarding node on the fourth FlexE path is the second destination node;

send the third path establishment request message to the second destination node; and receive a third resource reservation message that is sent by the second destination node based on the third path establishment request message;

the processor is further configured to determine a third slot resource based on the third resource reservation message; and the processor is further configured to: establish and store a correspondence between the third slot resource and a fourth slot resource on a fifth FlexE path, so that the first forwarding node maps, to a slot corresponding to the third slot resource, the third service flow mapped to a slot corresponding to the fourth slot resource, wherein the fifth FlexE path is a FlexE path between the second forwarding node and the first forwarding node, and the slot corresponding to the third slot resource is a slot that is used to transmit the third service flow and that is on the fifth FlexE path.

* * * * *

UNITED STATES PATENT AND TRADEMARK OFFICE
CERTIFICATE OF CORRECTION

PATENT NO. : 11,228,526 B2
APPLICATION NO. : 16/749506
DATED : January 18, 2022
INVENTOR(S) : Zongpeng Du, Guoyi Chen and Jie Dong Page 1 of 1

It is certified that error appears in the above-identified patent and that said Letters Patent is hereby corrected as shown below:

On the Title Page

Column 1 Please insert the foreign application priority data shown below:
--Foreign Application Priority Data
August 4, 2017   (CN).............201710662235.0--

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*